United States Patent [19]

Senour et al.

[11] 3,728,625
[45] Apr. 17, 1973

[54] DIGITAL INDICATOR WITH PULSE MULTIPLIER FOR PROVIDING CONTINOUS FULL SCALE RESOLUTION

[75] Inventors: Donald A. Senour, Carlisle; Janusz S. Kobel, Cambridge, both of Mass.

[73] Assignee: BLH Electronics Inc., Waltham, Mass.

[22] Filed: Nov. 24, 1970

[21] Appl. No.: 92,412

[52] U.S. Cl. ............324/99 D, 324/115, 340/347 AD
[51] Int. Cl. .....G01r 17/06, G01r 15/08, H03k 13/20
[58] Field of Search ..................324/99 D, 99 R, 115, 324/100; 340/347 AD

[56] References Cited

UNITED STATES PATENTS 3,617,885  11/1971  Wheable ............................324/115

FOREIGN PATENTS OR APPLICATIONS 1,564,758  3/1969  France..............................324/99 D

OTHER PUBLICATIONS

Electronic Design; Vol. 6; No. 2; Jan. 22, 1958; pages 44–45.

*Primary Examiner*—Rudolph V. Rolinec
*Assistant Examiner*—Ernest F. Karlsen
*Attorney*—Thomson & Mrose

[57] ABSTRACT

An analog-to-digital converter of a dual-slope integrating voltage-to-proportional-count device cooperates with a pulse multiplier to control full-scale resolution of measurements for different transducer inputs, the fixed-rate pulse output of the converter alternately being coupled to a binary-coded decimal counter for a preselected count interval during first predetermined integrating periods while an unknown transducer input is sampled, and being in synchronized control of the supply of pulses to the same counter at selected multiplied rates during second periods while a reference potential is referred to; a visual readout operated by the counter indicates the measurements with a resolution improved by the pulse-multiplication.

6 Claims, 2 Drawing Figures

INVENTORS:
JANUSZ S. KOBEL
DONALD A. SENOUR

BY Thomson & Mrose
ATTORNEYS

DIGITAL INDICATOR WITH PULSE MULTIPLIER FOR PROVIDING CONTINOUS FULL SCALE RESOLUTION

BACKGROUND OF THE INVENTION

The present invention relates to improvements in measurement resolution of digital indicating instruments, and, in one particular aspect, to unique high-accuracy digital indicating voltmeters in which synchronized clock-pulse multiplication enchances full-scale resolution capabilities for measurements of voltage outputs from transducers having dissimilar ranges of operation, such as a variety of strain-gage transducers designed to respond to different maximum loads.

Digital indicating instruments based upon computer-type circuitry and digital character displays have become highly practical devices which are both exceedingly rapid in operation and are easily read. The resolutions of measurements by such devices are of course limited by the number of display digits involved, and by the relationships between changes in the least significant digit and accurately-sensed changes in whatever is being measured. In the case of a five-digit display by a dual-slope integrating digital voltmeter, for example, there may be a use in which the voltmeter responds to the output from a 10,000-pound load cell transducer, and the voltmeter system accuracy may be such that the display may register the full 10,000 lbs. with a 1-pound resolution, or a resolution of 0.01 percent of full scale. The said dual-slope integrating voltmeter includes circuitry which translates the measured voltage into a related count of pulses, and, in the stated example, the precision is such that each pulse of 10,000 pulses would characterize one pound of the measured load. If the same digital voltmeter is next called upon to respond to a 2,000-pound output from the same load-cell transducer, or from one which also produces voltage outputs on the same linear scale as the aforesaid 10,000 pound cell, both the pulse count and related digital readout would be 2,000, with the same 1-pound resolution; however, the full-scale resolution in such a case would be 1-out-of 2,000, or a much coarser 0.05 percent of full scale resolution (vs. the said 0.01 percent). The resolution in the latter case could be improved by resorting to use of a digital voltmeter having a larger number of digits and a capability of producing more pulses per increment of measured voltage, but this would add significant cost and complexity. In accordance with teachings of the present invention, however, a single integrating digital indicating instrumentation system overcomes the aforementioned type of resolution problem, without addition of a further display digit and its related supporting hardware and electronic networks, by way of one programmable synchronized pulse-multiplier unit associated with the voltage-to-count circuitry of the system. The multiplier unit, when operated in the cited case of measurements involving a 2,000 pound cell output, would then produce 20,000 measurement-related pulses, rather than 10,000, and the five-digit display would then read 2,000.0 pounds, with a resolution of 0.2 pound, such that there would be a desired 0.01 percent resolution for the 2,000-pound reading.

SUMMARY OF THE INVENTION

The present invention is aimed at creating an improved and highly precise digital measurement system which is particularly suitable for displays, with optimum full-scale resolution, of the load measurements by a variety of different range load cell transducers or the like. In a preferred embodiment, the single or summed D. C. analog output voltage from strain-gage load-transducer bridge circuitry is applied as input to an analog-to-digital converter of a known type in which, periodically, the input is first integrated for a predetermined interval determined by generation of a fixed number of pulses by a "clock" oscillator, the integrated signal then being discharged down to a reference potential in a second interval as timed by further clock pulses whose number characterizes the measured voltage. Improvement of full-scale resolution is brought about by pre-selected pulse multiplications during the second intervals, these multiplications being synchronized with the clock oscillator and involving the production of a selected integral multiple number of pulses for each occurrence of a clock pulse. Counting and digital display of the numbers of pulses occuring during the aforesaid second intervals is performed by conventional readout equipment which indicates the measured load, there being a direct correlation between the numbers of pulses and the pounds of load measured by the transducer circuitry.

Accordingly, it is one of the objects of the present invention to provide a unique high-precision digital indicating system which affords improved full-scale resolutions of a variety of measurement inputs.

Another object is to provide an integrating-type digital voltmeter in which synchronized pulse-multiplications enhance resolutions of certain measurements without necessitating incorporation of additional digits in associated readout equipment.

A further object of the invention is the provision of a pulse-multiplying digital indicator in which the numbers of pulses which control the digital readout of measurement data are integrally multiplied to cause resolutions of readouts for different levels of input signals to be improved.

Still further, it is an object to provide an integrating-type digital voltmeter wherein clocking pulses synchronize and control the production of programmable integral multiples of voltage-to-count pulses, thereby enabling full-scale resolutions to be adjusted without attendant likelihood of measurement error.

BRIEF DESCRIPTION OF THE DRAWINGS

Further details concerning preferred practice of the invention, as well as additional features, objects and advantages thereof, may best be perceived in connection with the following description taken in connection with the accompanying drawings, wherein.

DETAILED DESCRIPTION OF THE PREFERRED EMBODIMENT

Figure 1:
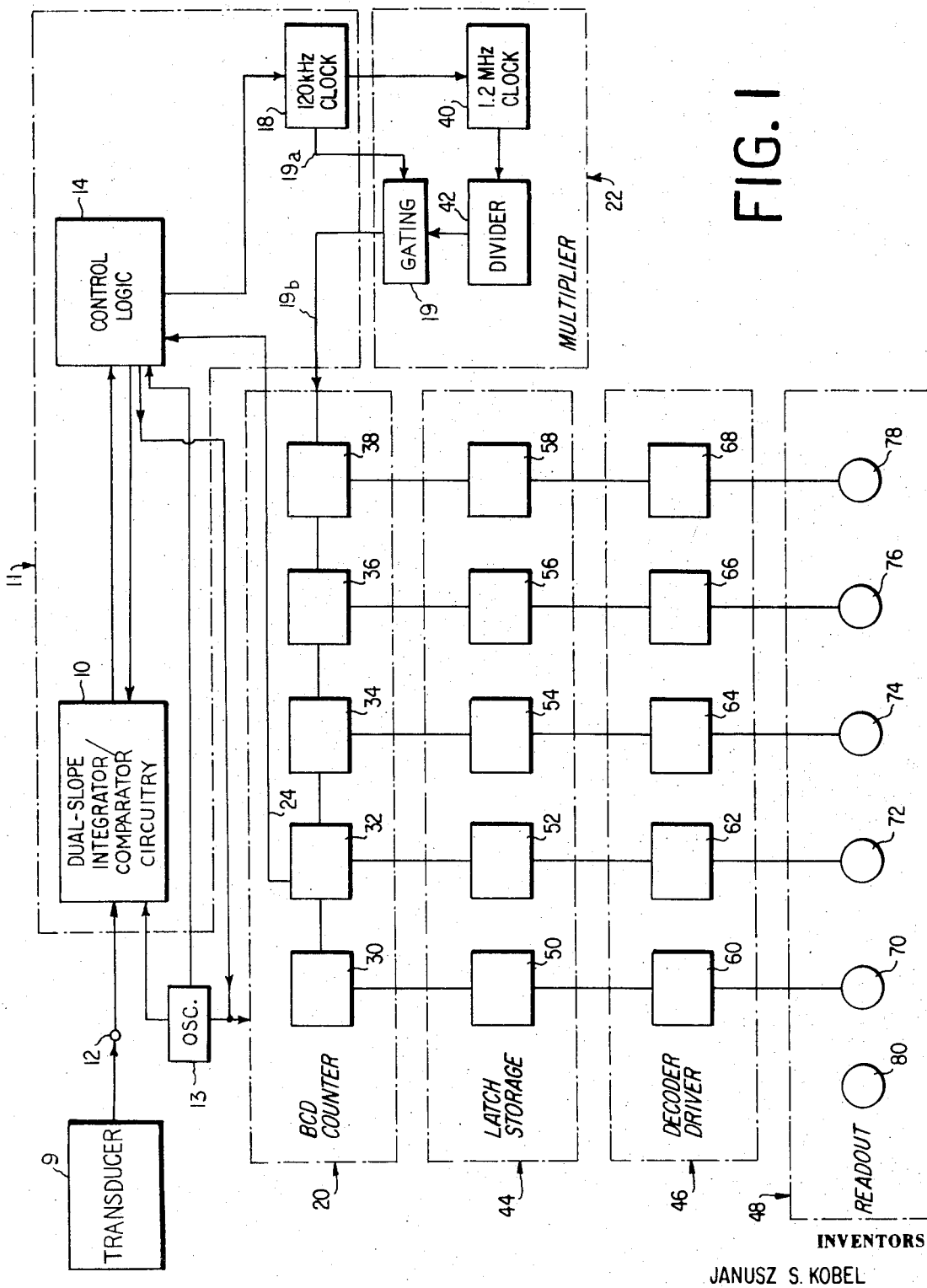
FIG. 1 is a block schematic diagram of an improved-resolution digital voltmeter system.

In FIG. 1, a solid-state digital indication system expressing the present invention is intended to respond to D.C. input signals developed by a measurement device 9, such as a strain-gage load-cell transducer or array of transducers. Typically, the strain gages in well-known forms of transducers are connected in bridge configuration, and the bridge output voltages bear a substantially direct relation to impressed loading. Translation of these output voltages into digital characterizations of the load under measurement may be accomplished by way of a dual-slope integrating voltmeter arrangement, 11, involving dual-slope integrator / comparator circuitry 10, control logic circuitry 14, and an associated pulse generator or "clock", 18, the latter being illustrated as a 120 KHz clock. A conventional output from a known type of network 11 would include periodic bursts of pulses, the number of pulses in each burst being directly related to the input terminal 12, with the output pulses in turn being delivered to a binary-coded-decimal (BCD) counter 20. Each counted burst of such pulses is stored in a conventional integrated-circuit latch storage unit 44, and the output of the latter excites a conventional decoder driver 46 driving the stages of a visual readout device 48. The decimal digital equivalent of the information appearing in counter 20 is thus reproduced on the readout device, which may comprise an appropriate number of digital display tubes, such as Nixie tubes in seven-segment arrays, or the like. By way of example, the readout device 48 may comprise known units manufactured for that purpose by Burroughs Corporation or National Electronics Company, and the items 20, 44 and 46 may comprise Texas Instruments Company Series 7400 TTL (transistor-transistor logic) units such as a BCD Counter Part No. 7490 N, a Latch Storage Device, Part No. SN 7475 N, and a decoder Driver Part No. SN. 7441 N, respectively. Analog-to-digital conversion in item 11 may be achieved with the Series 2300, Part No. 2317, apparatus manufactured for that purpose by Analogic Company, Wakefield, Massachusetts.

In relation to better appreciation of the specific improvements realized through practice of the present invention, it is helpful to consider first certain of the operating characteristics of a conventional form of dual-slope integrating voltmeter network 11. Collaterally, reference may be had to the descriptions contained in U.S. Pat. No. 3,368,149, issued Feb. 6, 1968, for example. As has already been alluded to, an objective of network 11 is to produce successive bursts of pulses, the number of pulses in each burst being directly related to the input voltage witnessed at terminal 12. Implementation of that objective involves the use of an oscillator 13, such as a conventional form of unijunction oscillator, which will deliver output pulses to units 11 and 20 at a given repition rate to initiate successive "readings" or development of the aforesaid successive bursts of pulses, and to reset or clear the counter 20. On command of each such output pulse from oscillator 13, the integrator/comparator circuitry commences integration of the input signal at terminal 12, and, simultaneously, clock 18 is controlled by logic 14 to commence a precise timing operation in which it delivers pulses at a precise rate to counter 20. In the illustration (FIG. 1), the pulses from clock 18 are passed to counter 20 through gating circuit 19 and couplings 19a and 19b. Once a predetermined pulse count has been reached in counter 20, on the occurrence of the 10,000th pulse for the five stages 30, 32, 34, 36 and 38 of counter 20, a resulting pulse is supplied to control logic circuitry 14 via coupling 24, causing the latter to reset the counter to a cleared condition and to initiate a discharge of a previously-integrated signal in integrator/comparator 10 back down to a predetermined low reference level, such as a system ground or zero level. Clock 18 feeds its pulse output to counter 20 during this second or "discharge" step until logic circuitry commands it to stop, which occurs when the aforesaid zero level is reached. Slope of the decreasing voltage is constant, and the time to reach the zero level is thus accurately proportional to the previously-integrated voltage, the latter in turn being precisely related to the voltage at terminal 12 because the time of its integration was closely governed by clock 18. In the remaining interval before the next succeeding output pulse is developed by oscillator 13, the count developed in the binary coded decimal counter 20 during the aforementioned second step of measurement operation is stored in the integrated-circuit latch storage unit 44, which includes five stages, 50, 52, 54, 56, and 58, one corresponding to each stage of the counter 20. In turn, the latch storage output is decoded to a decimal representation thereof in a conventional decoder driver 46, which similarly includes five stages, 60, 62, 64, 66 and 68, corresponding to the stages of unit 44. Decoder 46 incorporates the appropriate drivers for driving the respective five stages 70, 72, 74, 76 and 78 of visual readout 48, the latter indicating visually the decimal equivalent of the binary coded information appearing in counter 20. A known form of polarity-indicating readout stage 80 may also be provided. The repetition rate for the cyclic system readings is high enough for the readout to track expected changes in input signals, such as three readings per second.

If the transducer 9 is one which develops a predetermined maximum output voltage, such as 5.000 volts, characterizing a full load of 10,000 pounds, for example, the five-digit display of readout 48 will have a full-range resolution of one pound out of the 10,000, or 0.01 percent. This corresponds to the accuracy of one counted pulse out of a total of the 10,000 pulses counted during the second or discharge step in each cycle of operation of the integrator/comparator 10. For a given repetition rate of counting pulses from the master clock 18, the intrinsic measurement accuracy of the system is fixed; however, the second-step or output pulses which are counted for related display by the readout 48 are nevertheless advantageously multiplied in accordance with this invention to permit the same input voltage to be translated into an integrally-multiplied readout value or to permit a smaller input signal to be displayed as a readout with the same full-scale resolution as a larger signal. By way of illustration, a 5.000 volt input signal which is produced by the aforesaid 10,000-pound transducer may also be produced by 20,000-pound, 30,000-pound, 40,000-pound, etc. transducers (either directly or because of signal "conditioning" by the associated preamplifiers used in the transducers), and proper readouts from the latter should involve a multiplication by two, three, four, etc. Or, where readings such as up to a 1,000-pound reading are to be obtained for outputs up to 0.5 volt from the aforesaid 10,000-pound transducer, a multiplication by ten would give a full five-digit reading of up to the 1,000.0 pounds with an accuracy of up to 0.1 pound, or, again, the aforesaid 0.01 percent for the newly-selected full range of 1,000 pounds. These results are obtained by developing appropriate integral multiples of each of the pulses from master clock 18 only during those count-down intervals when the previously-integrated input signals are being discharged to the reference or zero level in integrator/comparator 10. Importantly, these integral multiplications are synchronized with and occur well within the periods between successive pulses from clock 18, otherwise readout errors could be caused.

For the aforementioned multiplication purposes, a pulse multiplier arrangement 22 is in a slaved synchronized relation to the master clock 18 and is programmed or set to insure that the desired pulse multiples are produced and fed to BCD counter 20. The multiplier includes a second "clock" or pulse oscillator, 40, which is selected to generate pulses at a fixed repetition rate many times greater than that of master clock 18, such as a 1.2 MHz rate vs. the 120 KHz rate of clock 18. A programmable divider 42 divides the pulses from auxiliary clock 40 by any of a predetermined integral number of divisions for which it is designed, such as from two to ten, and may be known Modulo-n type device such as that which is made by National Semiconductor Company under Part No. DM 8520.

As each pulse is developed by master clock 18 at the 120 KHz rate during each second or count-down interval of operation of integrator/comparator 10, it is applied in control of the auxiliary pulse-multiplying oscillator 40, and the latter responds to this command by producing a train or burst of pulses at the 1.2 MHz rate. Programmable divider 42, which has been set to divide the pulse output of auxiliary oscillator 40, is responsible for the predetermined set number of pulses being passed to the BCD counter 20 via the gating circuitry 19. Depending upon the selected setting of divider 42, counter 20 will witness 2, 3, 4, 5 . . . etc. short rapid pulses for each occurrence of a master clock pulse during the count-down interval. It is important that the operation of the auxiliary clock 40 be slaved in relation to that of the master clock, and that the repetition rate of clock 40 be much greater (example: ten times) than that of clock 18, to avoid the likelihood of counting errors.

Figure 2:
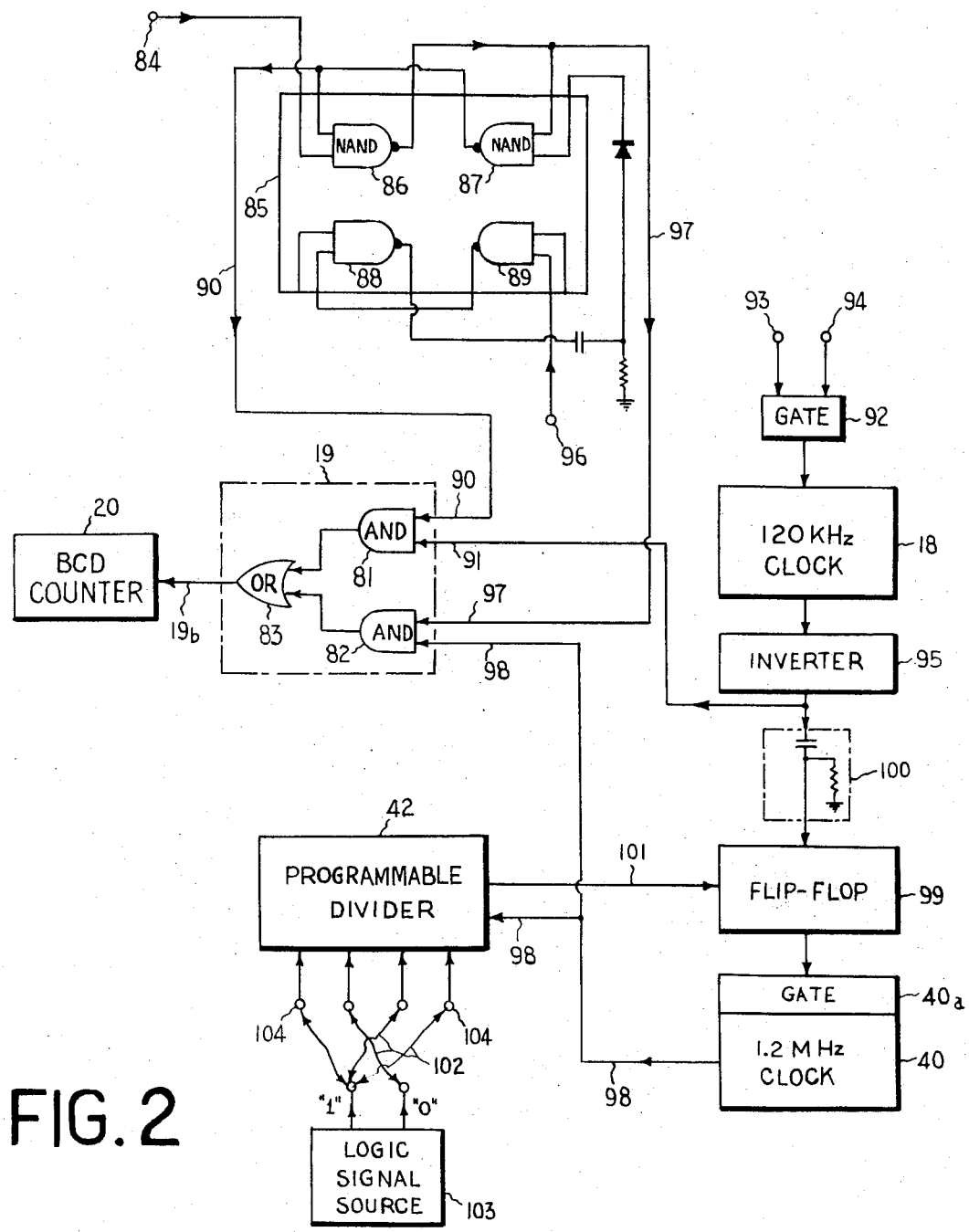
FIG. 2 is a partly schematic and partly block-diagrammed circuit illustrating certain details of the system of FIG. 1.

In FIG. 2, which includes further details of certain features of the improved system shown in FIG. 1, the aforementioned BCD counter 20 receives its pulses from a known form of gating circuitry 19 which involves a pair of And gates 81 and 82 delivering their outputs to coupling 19b through an Or gate 83. When the integration of an input signal at terminal 12 (FIG. 1) is about to commence, a recycling pulse from unijunction oscillator 13 is applied to terminal 84 (FIG. 2) of a known form of set-reset flip-flop circuit or quadrature Nand gate 85, including Nand gates such as 86–89. The Nand units respond to the recycling pulse by producing a gating signal in coupling 90, the latter appearing at the input of And unit 81 and enabling the same to pass 120 KHz master-clock pulses which appear there via coupling 91. The latter master clock pulses are of course developed by clock 18, as enabled by a known form of associated gate 92 whose logic inputs 93 and 94 periodically turn the clock on upon appearance of a recycling pulse from oscillator 13 and then turn it off when the integrator/comparator 10 produces a "crossover" output signalling that the previously-integrated input voltage has been discharges to the ground or reference level. Inverter 95 merely serves to develop a desired polarity of the clock pulse outputs. When the integration of the input voltage is completed, an occurrence of the 10,000th clock pulse in the specific case under consideration, a control signal is applied to terminal 96 of circuit 85, and circuit 85 thereupon terminates the enabling gate signal theretofore impressed at the input 90 of And unit 81, preventing further passage of master-clock pulses to counter 20. Simultaneously, the Nand-unit circuit 85 delivers an enabling gate signal to the input of And unit 82 of gate 20, via coupling 97. At that juncture, the gate 19 is readied to pass to the counter 20 only the multiplied pulses which are to improve the resolution of measurement in accordance with the principles explained earlier herein.

The aforesaid multiplied pulses are developed in coupling 98, as the result of interactions between clock 18, auxiliary clock 40, programmable divider 42, and a flip-flop circuit 99. For this purpose, the inverted output pulses from 120 KHz clock 18 are differentiated by a differentiator 100 to produce turn-on spike pulses for application to the Type D flip-flop 99, which is one which is turned on and off by applied pulses. The output of flip-flop 99, in response to each differentiated or spike input pulse, is applied to a gate portion 40a of a known form of auxiliary clock 40, which is designed to generate successive pulses at a 1.2 MHz rate many times (ten) the rate at which pulses are produced by master clock 18. When high-repetition rate clock 40 is thus gated into synchronized operation by the master clock, it delivers its pulses to both the programmable divider 42 and the aforesaid input to gate 19, over coupling 98. Depending upon its setting, divider 42 will allow only a predetermined integral number of auxiliary-clock pulses, such as 2, or 3, or 4, . . . etc., to be produced each time the clock 40 is gated into operation. Divider 42 is of a known form which will determine when a predetermined number of pulses appear on line 98 and will then apply a related inhibiting signal to flip-flop 99 over line 101, whereby the auxiliary clock 40 ceases to deliver output pulses until the next gating occurs in response to a master-clock pulse. In one convenient version, a Modulo-n divider has its dividing program set by way of manually-connected jumpers 102 applying appropriate logic 1 and 0 signals from a source 103 to the divider terminals 104 in a predetermined BCD code. All clock pulses cease when gate 92 disables master clock 18 upon occurrence of a "crossover" signal at the end of count-down of the integrated input voltage. The described cycle of operation is repeated upon recurrence of a recycling pulse signal from oscillator 13, such that the readout count may change along with changes in the system input signal.

It should be understood that the specific preferred embodiment and practices described herein have been presented by way of disclosure rather than limitation, and that those skilled in the art will appreciate that various modifications, combinations and substitutions may be effected without departure from the spirit and scope of this invention in its broader aspects and as set forth in the accompanying claims.

What we claim as new and desire to secure by Letters Patent of the United States is:

1. An electronic digital indicator system comprising integrator/comparator means cyclically integrating applied electrical input signal during first predetermined periods of time and determining the magnitudes of said input signal in terms of second periods of time which it takes for the integrated signal to assume a predetermined relation to a reference condition, timing means for producing periodic bursts of pulses at a predetermined repetition rate, said timing means comprising a master clock oscillator producing pulses at said predetermined rate, and an auxiliary clock oscillator responsive to said master oscillator pulses producing pulses at a repetition rate sufficiently higher than said predetermined rate for a relatively large number of pulses to be produced by said auxiliary oscillator for each pulse produced by said master oscillator, means synchronizing the commencement of the first and last burst of pulses of each of said periodic bursts of pulses with the beginning and end, respectively, of each of said second periods of time, means for selectably varying the number of pulses produced in each of said bursts of pulses by said timing means, said means for selectably varying said number of pulses comprising a programmable divider controlling the number of pulses produced by said auxiliary oscillator at said higher rate in response to each pulse produced by said master oscillator, and means providing a digital display characterizing the total number of pulses produced by said timing means during each of said second periods of time, the selective variations in the number of pulses produced in each of said bursts of pulses providing for adjustment or measurement resolution by said display means.

2. An electronic digital indicator system as set forth in claim 1 wherein said master clock oscillator controls said first periods of time in said integrator/comparator means, and wherein said programmable divider controls said auxiliary oscillator to produce an integral number of pulses at said higher rate within the periods of time between commencements of successive pulses from said master clock oscillator.

3. An electronic digital indicator system as set forth in claim 1 wherein said input signal is a voltage, wherein determining the magnitude of said input signal involves measuring the times for the integrated input voltage to discharge to a lower predetermined reference level, wherein said means providing a visual display includes a counter, and wherein said timing includes gating means coupling pulses developed by said master clock oscillator to said counter, means controlling the duration of said first periods of time in said integrator/comparator means in accordance with counts by said counter of a predetermined number of pulses developed by said master clock oscillator, and means controlling said gating means to couple to said counter the selectably-varied number of pulses in said bursts of pulses.

4. An electronic digital indicator system as set forth in claim 3 wherein said auxiliary clock oscillator comprises a gated oscillator, means applying said pulses produced by said master oscillator during said second periods to gate said auxiliary oscillator on, and means applying signals from said divider to gate said auxiliary oscillator off when the selected number of pulses is produced by said auxiliary oscillator responsive to each pulse from said master oscillator.

5. An electronic digital indicator system as set forth in claim 4 wherein said gating means includes a first And gate for coupling to said counter pulses developed by said master oscillator during said first periods, means cyclically applying an enabling signal to said first And gate to enable said coupling during said first periods, a second And gate for coupling to said counter the selectably-varied numbers of pulses in said bursts of pulses, and means cyclically enabling said latter coupling during said second periods each commencing with the ends of said first periods and ending with the last of pulses from said master oscillator during said second periods.

6. An electronic digital indicator system with adjustable full-scale resolution comprising a digital pulse clock for generating pulses at a predetermined rate, means for cyclically integrating an unknown input voltage during first predetermined periods of time as controlled by generations of a predetermined number of pulses by said clock, and means for cyclically measuring the second periods of time for the integrated voltage to assume a predetermined relation to a reference potential, said last-named means including a counter, means sensing occurrences of said predetermined relationship, pulse-multiplication means for producing a selected number of pulses which is an integral multiple of each of pulses generated by said clock, gate means passing to said counter the pulses from said pulse-multiplication means during said second periods of time as determined by the ends of said first periods and the sensing of said occurrences by said sensing means, and means displaying readouts related to the counts of multiplied pulses in said counter, said pulse-multiplication means including a pulse generator producing pulses at a significantly higher repetition rate than said predetermined rate in response to each of the pulses generated by said clock during said second periods, said higher repetition rate occasioning production by said pulse generator of all of a desired selectable number of pulses within the span of each of said clock pulses, and said pulse-multiplication means including a modulo-n divider programmable to apply to said gate means a selected number of the total number of pulses produced by said generator in response to each clock pulse during said second periods.

* * * * *